Feb. 5, 1935.　　　　E. L. BOWLES　　　1,989,678

ELECTRICAL SYSTEM

Filed Aug. 15, 1928

Inventor
Edward L. Bowles
By David Rines
Attorney

Patented Feb. 5, 1935

1,989,678

UNITED STATES PATENT OFFICE 1,989,678

ELECTRICAL SYSTEM

Edward Lindley Bowles, Wellesley Farms, Mass.

Application August 15, 1928, Serial No. 299,697

2 Claims. (Cl. 250—36)

The present invention relates to electric systems, and more particularly to systems for selecting predetermined frequencies from currents or voltages containing a number of different frequencies. The nature and objects of the invention will be explained hereinafter and will be particularly pointed out in the appended claims. The present application is a continuation in part of application Serial No. 129,498, filed August 16, 1926.

Figure 1:
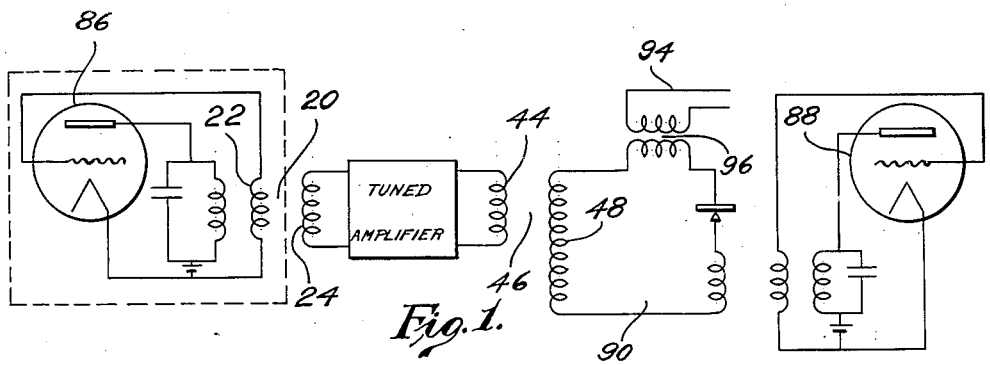
Figure 2:
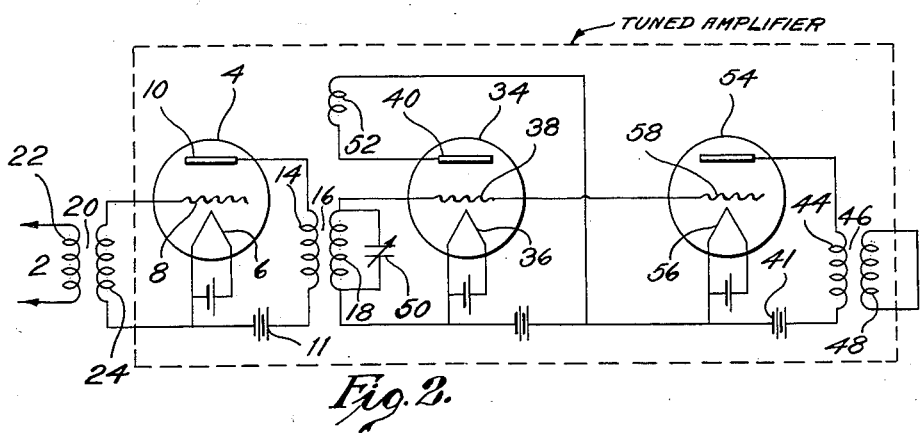

The invention will be explained in connection with the accompanying drawing, in which Fig. 1 is a diagrammatic view of a heterodyne oscillator adapted to produce a pure frequency; and Fig. 2 is a similar view of a preferred tuned amplifier for use in the system illustrated in Fig. 1.

Referring first to Fig. 2, a preferred tuned amplifier comprises an amplifier 4, shown as a vacuum tube or audion. The secondary winding 24 of an input transformer 20 is connected to the grid-filament or input circuit of the amplifier 4, between the filament 6 and the grid 8. The transformer 20, if desired, may be of the variable, or adjustable-ratio, type, but it is shown provided with a primary winding 22. The amplified energy traverses the amplifier output circuit, that is connected between the filament 6 and the plate 10 in series with a battery 11. A primary winding 14 of an output transformer 16 is connected in the output circuit and the secondary winding 18 of the transformer is connected in the input circuit of a second space-current device 34, between the filament 36 and the grid 38. A primary winding 44 of an output transformer 46 may be connected in the output circuit of the space-current device 34, between the filament 36 and the plate 40 in series with a battery 41. Preferably, however, for the reasons hereinafter stated, the winding 44 is inserted in the output circuit of still a third space-current device 54. The secondary winding of the transformer 46 is indicated at 48.

The input circuit of the space-current device 34 is rendered tunable by means of a variable condenser 50, across the winding 18. The inductive winding 14 is coupled to the tuned input circuit of the space-current device 34, which comprises the inductive winding 18 and the condenser 50. The voltage or current that is fed through the input transformer 20 into the circuits of the space-current device 4 is thus, in turn, fed into the tuned input circuit of the space-current device 34, through the transformer 16. This input circuit will be properly tuned by means of the condenser 50.

According to a feature of the present invention, as illustrated, for example, in Fig. 2, the selectivity of the tuned input circuit 18, 50 is improved through the introduction of negative resistance, as by regeneratively coupling it to the corresponding output circuit, to cause it to respond best to voltage or current of the particular, desired frequency in the winding 14. All the undesired frequencies will thus be eliminated from the alternating voltage or current transmitted to the output circuit of the space-current device 34.

As illustrated in Fig. 2, the regenerative coupling may be effected by means of a feed-back winding 52 in the output circuit of the tube 34, coupled to the inductive winding 18 in the input circuit. For an impressed voltage of a given frequency, a relatively large voltage will thus be produced between the grid 38 and the filament 36 of the space-current device 34. For the same impressed voltage of other frequencies, however, the voltage on the grid 38 will be smaller and smaller as the frequency departs more and more from the resonant frequency of the tuned circuit 14, 18, 50 combination. The presence of the winding 44 in the output circuit of the space-current device 34 may, in this case, disturb the conditions for regeneration by means of the inductive winding 52 were the latter in series with the winding 44. The winding 44 is, therefore, preferably inserted in the output circuit of the said third space-current device 54, the input circuit of which is coupled to the input circuit of the space-current device 34 in any desired way, as by connecting the filament 56 of the space-current device 54 with the filament 36 of the space-current device 34 and the grid 58 of the former with the grid 38 of the latter. Any other of the tuned amplifier circuits described in the aforesaid application may also be used.

It will be understood that the resonance response may be made sharp or dull, and the frequency of response varied, by varying the relation between the windings 14, 18, 52 and the condenser 50.

Referring, now, to Fig. 1, the ordinary vacuum-tube oscillator 86, as is well known, produces a current wave containing harmonic constituents, since the audion, when in oscillation, does not operate entirely on the linear portion of its volt-ampere characteristics. These harmonics are often of considerable magnitude and, therefore, objectionable. In order to obtain a pure-wave form from such an audion oscillator, it may, for example, be coupled in any desired way to the winding 24 of the input circuit of a tuned amplifier such as is illustrated in Fig. 2. This amplifier could then be tuned to the fundamental or to some harmonic frequency of the constituent frequencies of the oscillator, which it would amplify to the substantial exclusion of all other frequencies. It is thus possible to select the fundamental frequency alone, for example, and use that alone. As the output wave in the coil 44 is relatively pure, all that is necessary, in order to obtain a pure output wave in the circuit where the power is used, is to couple such circuit to the coil 44.

This is on the assumption,—which is true in fact,—that the tuned amplifier has a virtue superior to that of the oscillator 86; for in the oscillator, as before explained, the output-circuit voltage travels between wide limits that include curved portions of the current and voltage characteristics, while in the tuned amplifier, which is operated by forced vibrations only, the operating point on the output-current, output-voltage characteristic may be predetermined by proper adjustment of the grid and plate voltages. Thus, by applying but a small voltage to the coil 24, the range of operation on the output-voltage, output-current characteristic may be made to agree with a substantially linear portion of that characteristic. The output-current variations may thus be made to be substantially of the fundamental frequency. It would be impossible to obtain a current of harmonic frequency in the coil 44 on the assumption of perfect selectivity in the tuned amplifier and a linear characteristic.

Fig. 1 illustrates the invention applied to the obtaining of a pure or single-frequency output from a heterodyne oscillator. The operation will be understood in connection with the description above by a simple example.

Let it be assumed that two oscillators 86 and 88, differing in frequency by 1000 cycles per second, are coupled to a detector or rectifying circuit 90. Thus, the frequency of the wave traversing the oscillator 86 may be assumed to be 50,000 cycles per second, and that of the oscillator 88, 49,000 cycles. Then a current of a difference in frequency of 1000 cycles per second will make its appearance in the circuit 90. But there will also be currents of second, third, fourth and higher harmonic frequencies of 2000, 3000, 4000, etc. cycles per second, produced by each of the higher harmonic frequencies of the oscillators 86 and 88.

To prevent the appearance of the currents of higher-difference frequencies in the circuit 90, all that is necessary is to cause one of the oscillators 86 and 88 to produce a pure, single-frequency voltage. This may be accomplished, in effect, in accordance with the present invention, by coupling one of the oscillators, say the oscillator 86, to the circuit 90, not directly, but through the tuned amplifier. The pure-difference, frequency current may be led away from the circuit 90 into an output circuit 94 through a coupling 96, or in any other desired manner.

It will be understood that the invention is not limited to the exact embodiments thereof that are illustrated and described herein, but that modifications may be made by persons skilled in the art without departing from its spirit and scope, as defined in the appended claims.

What is claimed is:

1. An electric system comprising two oscillating circuits, a rectifying circuit coupled to the two circuits to cause beat frequencies to be produced in the rectifying circuit, a circuit coupled to one of the oscillating circuits, and means for regeneratively tuning the coupled circuit to suppress from the rectifying circuit all frequencies except a predetermined frequency of said one of the oscillating circuits.

2. An electric system comprising two oscillating circuits, a rectifying circuit coupled to the two circuits to cause beat frequencies to be produced in the rectifying circuit, and a tuned amplifier coupled to one of the oscillating circuits for suppressing from the rectifying circuit all frequencies except a predetermined frequency of said oscillating circuit.

EDWARD L. BOWLES.